(12) United States Patent
Singh et al.

(10) Patent No.: US 12,093,671 B2
(45) Date of Patent: Sep. 17, 2024

(54) TRANSLATING LARGE SOURCE CODE USING SPARSE SELF-ATTENTION

(71) Applicant: Google LLC, Mountain View, CA (US)

(72) Inventors: Rishabh Singh, San Jose, CA (US); Bin Ni, Fremont, CA (US); Manzil Zaheer, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 147 days.

(21) Appl. No.: 17/731,593

(22) Filed: Apr. 28, 2022

(65) Prior Publication Data

US 2023/0350657 A1    Nov. 2, 2023

(51) Int. Cl.
G06F 9/445    (2018.01)
G06F 8/51    (2018.01)

(52) U.S. Cl.
CPC ...................... G06F 8/51 (2013.01)

(58) Field of Classification Search
CPC ........ G06N 20/00; G06N 3/045; G06N 20/10; G06N 3/043; G06N 3/09; G06N 5/02; G06N 5/025; G06N 3/02; G06N 3/0475; G06N 3/042; G06N 3/0895; G06N 3/096; G06F 8/51
USPC .................................................. 717/100–120
See application file for complete search history.

(56) References Cited

U.S. PATENT DOCUMENTS

| 11,720,346 B2 * | 8/2023 | Wu ........................... G06F 8/70 707/741 |
| 2021/0011694 A1 | 1/2021 | Ni et al. |
| 2022/0138266 A1 * | 5/2022 | Wang ................. G06F 16/9024 707/722 |
| 2022/0237368 A1 * | 7/2022 | Tran ...................... G06N 20/00 |

OTHER PUBLICATIONS

Zhang et al., "SG-Net: Syntax-Guided Machine Reading Comprehension" arXiv:1908.05147v3 [cs.CL] 9 pages, dated Nov. 20, 2019.
Hu et al., "Deep Code Comment Generation" in Proceedings of IEEE/ACM International Conference on Program Comprehension, Gothenburg, Sweden, May 27-May 28, 2018 (ICPC'18). ACM, New York, NY, USA, 11 pages. https://doi.org/10.475/123_4.

(Continued)

Primary Examiner — Chuck O Kendall
(74) Attorney, Agent, or Firm — Gray Ice Higdon

(57) ABSTRACT

Techniques are described herein for translating source code using sparse-self attention. In various implementations, a source code snippet in a first programming language may be processed to obtain graph(s) representing snippet tokens, and relationships therebetween. Based on the graph(s), a subset of snippet token pairs may be identified from a superset of all possible token pairs in the source code snippet. Each token pair of the subset may include snippet tokens that are represented by nodes connected by one or more edges of the one or more graphs. A self-attention network of a translation machine learning model may be adapted to sparsely attend across the identified subset of token pairs. The source code snippet may then be processed based on the adapted translation machine learning model to generate a translation of the source code snippet in the second programming language.

20 Claims, 6 Drawing Sheets

(56) References Cited

OTHER PUBLICATIONS

Ahmad et al., "A Transformer-based Approach for Source Code Summarization" Proceedings of the 58th Annual Meeting of the Association for Computational Linguistics, pp. 4998-5007. Jul. 5-10, 2020.
Wu et al., "Code Summarization with Structure-induced Transformer" Findings of the Association for Computational Linguistics: ACL-IJCNLP 2021, pp. 1078-1090, Aug. 1-6, 2021.
Ainslie et al., "ETC: Encoding Long and Structured Inputs in Transformers" arXiv:2004.08483v5 [cs.LG] 17 pages, dated Oct. 27, 2020.
Tay et al., "Efficient Transformers: A Survey" arXiv:2009.06732v2 [cs.LG] 28 pages, dated Sep. 16, 2020.
Zaheer et al., "Big Bird: Transformers for Longer Sequences" arXiv:2007.14062v2 [cs.LG] 42 pages, dated Jan. 8, 2021.
Liu et al., "Transformer Acceleration with Dynamic Sparse Attention" arXiv:2110.11299v1 [cs.LG] 13 pages, dated Oct. 21, 2021.
Child et al., "Generating Long Sequences with Sparse Transformers" arXiv: 1904.10509v1 [cs.LG] 10 pages, dated Apr. 23, 2019.
Beltagy et al., "Longformer: The Long-Document Transformer" arXiv:2004.05150v2 [cs.CL] 17 pages, dated Dec. 2, 2020.
Vaswani et al., "Attention Is All You Need" arXiv: 1706.03762v5 [cs.CL] 15 pages, dated Dec. 6, 2017.
European Patent Office; International Search Report and Written Opinion issued in Application No. PCT/US2023/020007; 10 pages; dated Aug. 29, 2023.

\* cited by examiner

228

Function add (a, b, c) {
s = a + b;
result = s + c;
console.log("Total Sum" + result);
Return result;
}

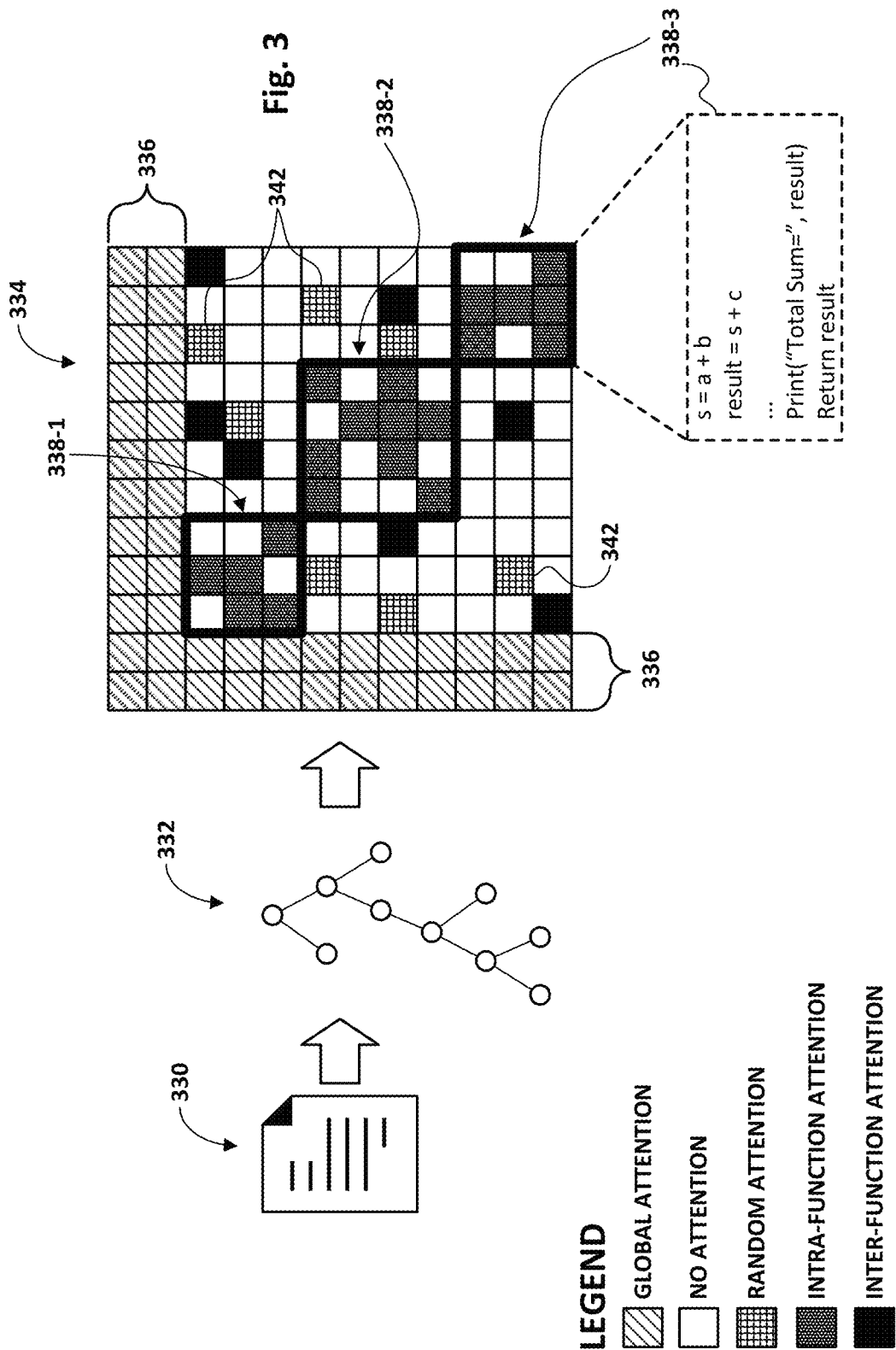

TRANSLATING LARGE SOURCE CODE USING SPARSE SELF-ATTENTION

BACKGROUND

Computer software programming often requires developers to read and/or write source code (i.e., to program) in a specific programming language, e.g. Java, C++, C, Python, etc. Each programming language has its own strengths, weaknesses, nuances, idiosyncrasies, etc. Additionally, some programming languages are more suitable for certain stages of software development and/or a software life cycle than others. As one example, scripting languages such as Python, JavaScript, Perl, etc., are often more effectively used near the very beginning of software development because programmers using these languages are able to turn around functional software relatively quickly. Most programmers obtain at least a superficial understanding of multiple programming languages, but only master a few. Consequently, each programming language tends to have its own talent pool.

Large language models (also referred to as "neural translators") such as transformer networks have become increasingly popular for performing natural language processing. Transformer networks were designed in part to mitigate a variety of shortcomings of prior natural language processing models, such as overfitting, the vanishing gradient problem, and exceedingly high computational costs, to name a few. However, transformer networks still require large amounts of memory when processing large sequences of data, such as large pieces of source code.

One reason attention-based networks such as transformer networks impose significant computational costs (especially memory) when used to process large sequences of data is that they include attention mechanisms that attend across all possible pairs of input tokens. Such an attention mechanism may be referred to as an "all pair attention network" because every input (e.g., source code token) is conceptually connected to, and hence attended against, every other input token, regardless of whether those tokens are dependent on each other logically. For relatively short sequences of inputs, such as source code snippets having relatively few tokens (e.g., 500 or less), the computational costs associated with an all-pair attention network may be acceptable, if not ideal. However, as the sequence of inputs grows in length, the memory requirements grow as well, quickly becoming unwieldy.

SUMMARY

Implementations are described herein for encoding large structured textual data for purposes such as translation between domain-specific languages, with reduced memory requirements. More particularly, but not exclusively, implementations are described herein for translating source code between programming languages using machine learning models with sparse self-attention mechanisms. Using sparse attention mechanisms avoids wasting computing resources, particularly memory, on calculations that have limited to no utility for performing downstream tasks such as translation.

In some implementations, a method for translating a source code snippet from a first programming language to a second programming language may be implemented by one or more processors and may include: obtaining one or more graphs representing snippet tokens, and relationships between the snippet tokens, contained in the source code snippet written in the first programming language; based on the one or more graphs, identifying, from a superset of all possible pairs of the snippet tokens in the source code snippet, a subset of snippet token pairs, wherein each token pair of the subset includes snippet tokens that are represented by nodes connected by one or more edges of the one or more graphs; adapting a self-attention network of a translation machine learning model to sparsely attend across the identified subset of token pairs; and processing the source code snippet based on the adapted translation machine learning model to generate a translation of the source code snippet in the second programming language.

In various implementations, the one or more graphs may include at least one of a data flow graph (DFG), a control flow graph (CFG), or an abstract syntax tree (AST) representing the source code snippet. In various implementations, the edges of one or more of the graphs may represent dependencies between the snippet tokens.

In various implementations, the source code snippet may be a function, and the method may further include processing an entire source code file that contains the function to identify global tokens defined in a portion of the source code file outside of the function, wherein the self-attention network is adapted based at least in part on the global tokens. In various implementations, the method may include adapting the self-attention network of the translation machine learning model to attend between each of the global tokens and all other tokens of the source code file.

In various implementations, the method may further include: analyzing the one or more graphs to identify, as inter-function token pairs, tokens from different functions that are connected by one or more edges of one or more of the graphs; and adapting the self-attention network to further sparsely attend across the inter-function token pairs. In various implementations, one or more of the inter-function pairs may be a function definition and a function call. In various implementations, the method may further include: identifying dependencies between one or more other functions of the source code file and the function defined in the source code snippet; and adapting the self-attention network of the translation machine learning model to further sparsely attend based on the identified dependencies.

In various implementations, the method may include adapting the self-attention network to attend across other randomly-selected token pairs of the superset.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3 is a block diagram showing an example of how source code may be processed to generate a sparse attention network, in accordance with various implementations.

DETAILED DESCRIPTION

Figure 1:
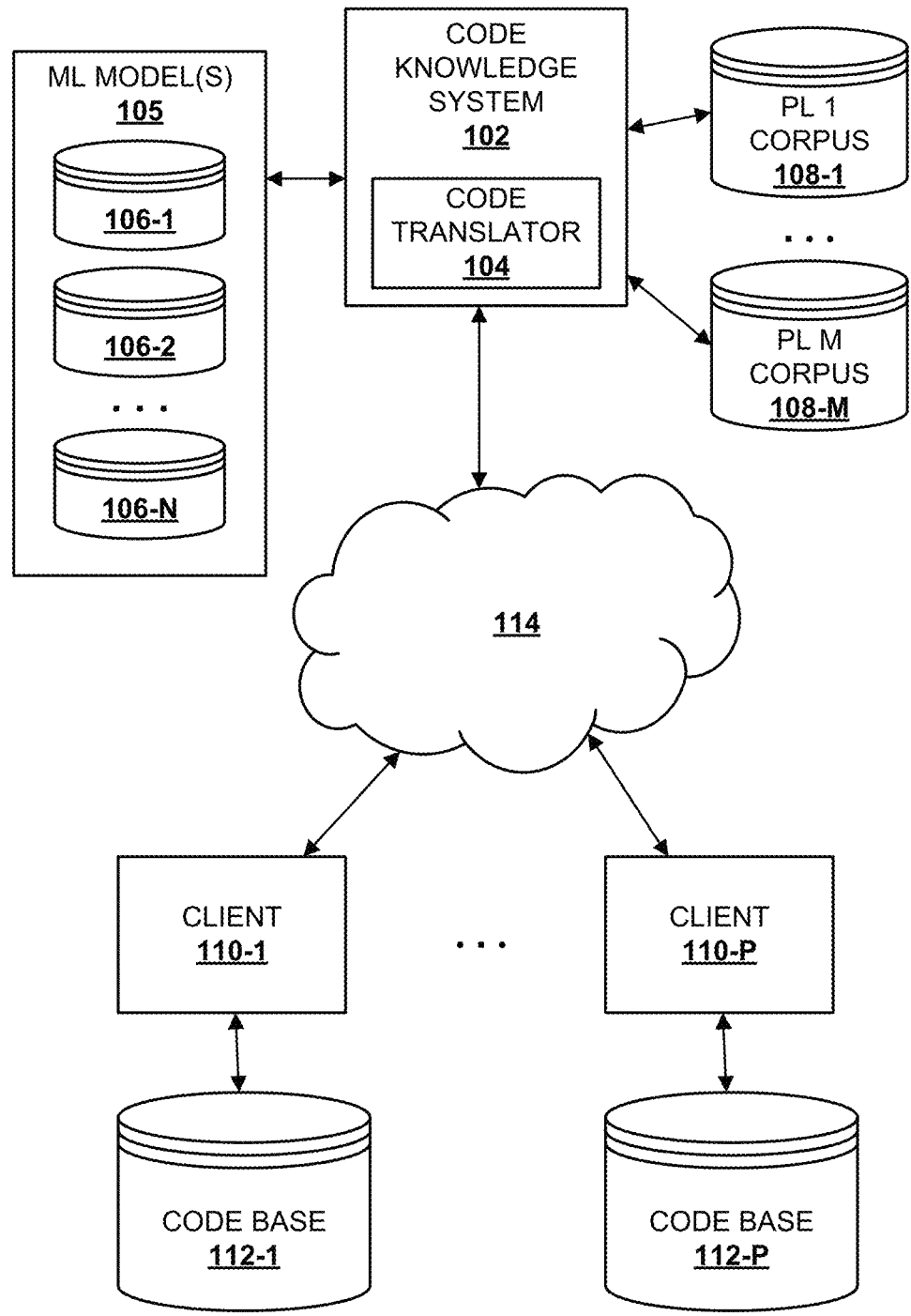
FIG. 1 schematically depicts an example environment in which selected aspects of the present disclosure may be implemented, in accordance with various implementations.

Implementations are described herein for encoding large structured textual data for purposes such as translation between domain-specific languages, with reduced memory requirements. More particularly, but not exclusively, implementations are described herein for translating source code between programming languages using machine learning models with sparse self-attention mechanisms. Using sparse attention mechanisms avoids wasting computing resources, particularly memory, on calculations that have limited to no utility for performing downstream tasks such as translation.

Machine learning models configured with selected aspects of the present disclosure may take various forms, with various types of attention mechanisms. In some implementations, the machine learning model may take the form of a transformer network, such as a BERT (Bidirectional Encoder Representations from Transformers) transformer and/or a GPT (Generative Pre-trained Transformer). The transformer model may be trained using one or more corpuses of documents and other data that is relevant to structured text in general, or programming language(s) in particular. These documents may include, for instance, source code examples, programming handbooks or textbooks, general programming documentation, natural language comments embedding in source code, and so forth.

As mentioned previously, to conserve computing resources such as memory, a machine learning model configured with selected aspects of the present disclosure may include a sparse self-attention mechanism. This sparse self-attention mechanism may be represented conceptually as a self-attention network that includes nodes representing inputs (e.g., source code tokens) and edges between the nodes that dictate which inputs are attended against each other. The self-attention network may be adapted to sparsely attend across subsets of token pairs that are related (e.g., dependent) to each other within source code, rather than across all possible token pairs. In various implementations, matrices that represent these sparse self-attention networks may be instantiated such that memory is only allocated for attended token pairs, instead of simply being allocated for all possible token pairs, attended or otherwise.

To identify source code token pairs to attend across, source code may first be processed to generate one or more graphs that represent tokens in the source code, as well as relationships (e.g., dependencies) between those tokens. These one or more graphs may take various forms, such as a data flow graph (DFG), a control flow graph (CFG), or an abstract syntax tree (AST). Edges between nodes of these graphs may represent dependencies between the tokens underlying the nodes. Accordingly, the graphs may be analyzed to identify, from a superset of all possible token pairs in the source code, a subset of related token pairs. Each related token pair of this subset may include tokens that are represented by nodes that are connected by one or more edges of the one or more of the graphs, and therefore are dependent on each other. For example, any tokens represented in the graph(s) by nodes that are connected by no more than some integer n (e.g., one, two, etc.) of edges may be identified as a token pair of the subset. Token pairs represented in the graph(s) by nodes that are connected by a greater number of edges-which suggests a weaker relationship, lack of dependency, etc.—may not be selected for the subset.

Once the subset of related token pairs is identified, a self-attention network of a translation machine learning model (e.g., a BERT transformer) may be adapted to include edges that correspond to the token pairs of the subset. Then, source code may be processed based on the adapted translation machine learning model to generate a translation of the original source code in a second programming language. For example, an encoding of the original source code may be generated by an encoder portion of the translation machine learning model based at least in part on the sparse self-attention network. This encoding may then be processed using a decoding portion of the translation machine learning model to generate the translation in the second programming language. If translation is not the ultimate goal, then the decoder portion may be trained for performance of another task, such as code summarization, quality metric prediction, etc.

Techniques described herein allow larger pieces of source code to be translated than would be feasible with conventional machine learning models with all-pair self-attention mechanisms. In fact, techniques described herein facilitate translation of entire source code files, which may contain any number of functions, classes, global variables, etc. To this end, in some implementations, self-attention networks may be adapted to attend across source code tokens not only within functions ("intra-function token pairs"), but across tokens contained in different functions ("inter-function token pairs").

For example, global tokens and/or class definitions may be identified in portion(s) of a source code file outside of functions. In some implementations, the self-attention network of the translation machine learning model may be adapted to attend between the global tokens and all other tokens contained in the input source code, akin to an all-pair attention mechanism, while still attending sparsely across tokens within function(s). In some implementations, one or more graphs (e.g., CFGs, ASTs, DFGs) representing relationships between tokens contained within multiple different function(s) may be evaluated to identify inter-function token pairs that are functionally and/or logically related. The self-attention network may be adapted based at least in part on these inter-function token pairs.

FIG. 1 schematically depicts an example environment in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs", tensor processing units or "TPUs") that execute computer-readable instructions stored in memory, or other types of logic such as application-specific integrated circuits ("ASIC"), field-programmable gate arrays ("FPGA"), and so forth. Some of the systems depicted in FIG. 1, such as a code knowledge system 102, may be implemented using one or more server computing devices that form what is sometimes referred to as a "cloud infrastructure," although this is not required.

A code knowledge system 102 may be provided for helping clients 110-1 to 110-P manage their respective code bases 112-1 to 112-P. Code knowledge system 102 may include, among other things, a code translator 104 that is configured to perform selected aspects of the present disclosure in order to help one or more clients 110-1 to 110-P to manage and/or make changes to one or more corresponding code bases 112-1 to 112-P. Each client 110 may be, for example, an entity or organization such as a business (e.g., financial institute, bank, etc.), non-profit, club, university, government agency, or any other organization that operates one or more software systems. For example, a bank may operate one or more software systems to manage the money under its control, including tracking deposits and withdrawals, tracking loans, tracking investments, and so forth. An airline may operate one or more software systems for booking/canceling/rebooking flight reservations, managing delays or cancellations of flight, managing people associated with flights, such as passengers, air crews, and ground crews, managing airport gates, and so forth.

Code translator 104 may be configured to leverage knowledge of multiple different programming languages in order to aid clients 110-1 to 110-P in translating between programming languages when editing, updating, re-platforming, migrating, or otherwise acting upon their code bases 112-1 to 112-P. For example, code translator 104 may be configured to translate code snippets from one programming language to another, e.g., on the fly or in batches. This may, for instance, enable a developer fluent in a first programming language to view and/or edit source code that was originally written in a second, less-familiar programming language in the first programming language. It may also significantly decrease the time and/or costs associated with migrating code bases between different programming languages.

In various implementations, code knowledge system 102 may include a machine learning ("ML" in FIG. 1) database 105 that includes data indicative of one or more trained machine learning models 106-1 to 106-N. These trained machine learning models 106-1 to 106-N may take various forms that will be described in more detail below, including but not limited to BERT (Bidirectional Encoder Representations from Transformers) transformers, GPT (Generative Pre-trained Transformer) transformers, a graph-based network such as a graph neural network ("GNN"), graph attention neural network ("GANN"), or graph convolutional neural network ("GCN"), other types of sequence-to-sequence models and/or encoder-decoders, various flavors of a recurrent neural network ("RNN", e.g., long short-term memory, or "LSTM", gate recurrent units, or "GRU", etc.), and any other type of machine learning model that may be applied to facilitate selected aspects of the present disclosure.

In some implementations, code knowledge system 102 may also have access to one or more programming-language-specific corpuses 108-1 to 108-M. In some implementations, these programming-language-specific corpuses 108-1 to 108-M may be used, for instance, to train one or more of the machine learning models 106-1 to 106-N. In some implementations, the programming-language-specific corpuses 108-1 to 108-M may include examples of source code (e.g., entire code bases, libraries, etc.), inline comments, textual metadata associated with source code (e.g., commits), documentation such as textbooks and programming manuals, programming language-specific discussion threads, presentations, academic papers, and so forth.

In some implementations, a client 110 that wishes to enable manipulation of its code base 112 in programming language(s) other than that/those used originally to write the source code may establish a relationship with an entity (not depicted in FIG. 1) that hosts code knowledge system 102. When a developer wishes to view/edit a source code snippet of the entity's code base 112 but is unfamiliar with the native programming language, code translator 104 may provide one or more versions of the source code snippet that is translated to a target programming language preferred by the developer. In some such implementations, code translator 104 may generate the translated source code snippet on the fly, e.g., in real time. In other implementations, code translator 104 may operate, e.g., in a batch mode, to preemptively translate all or selection portions of an entity's code base 112 into a targeted programming language. In some implementations in which the developer then edits the translated source code snippet, the edited version may be translated back into the native programming language or left in the new, target programming language, assuming other necessary infrastructure is in place.

In other implementations, trained translation models may be deployed closer to or at the edge, e.g., at client devices 110-1 to 110-P. Because these trained translation models utilize sparse self-attention mechanisms, they may be effectively applied at relatively resource-constrained resources of the edge, rather than in the cloud. Edge-based deployment may give rise to a variety of benefits, such as maintenance of privacy, protection of sensitive source code, and so forth.

Figures 2A, 2B:
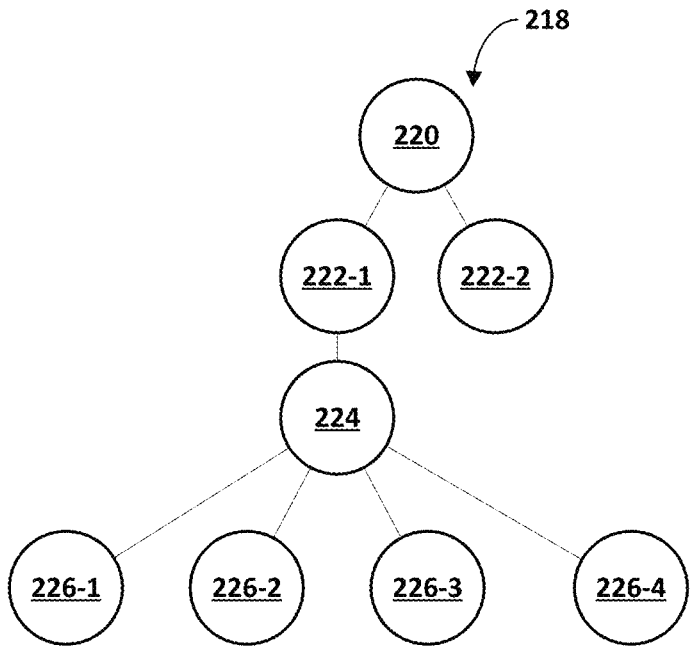
FIG. 2A and FIG. 2B depict various types of graphs that can be generated to represent aspects of source code, in accordance with various implementations.

FIG. 2A and FIG. 2B depict examples of how graphs may be generated from source code for purposes of sparsely attending across tokens that are logically related to each other. FIG. 2A depicts an example graph 218 that represents a source code hierarchy. Nodes of graph 218 may represent types of programmatic structures. For example, node 220 may represent the AST of an entire program represented by the source code, with some nodes (e.g., representing function declarations) that have their own subtrees being collapsed. Nodes 222-1 and 222-2 may represent functions declarations included in the source code. Node 224 may represent a block statement that corresponds to a function definition of each function declaration. And nodes 226-1 to 226-4 may represent individual expressions and/or statements. The edges between these nodes of graph 218 may represent hierarchal relationships between the various source code components represented by the nodes.

FIG. 2B depicts an example function definition called "add." The "add" function calculates the sum of its three arguments, variables a, b, and c, outputs the sum (e.g., at a console), and returns the sum. The arrows depicted in FIG. 2B demonstrate logical relationships between various tokens of the function, and may correspond to edges of a graph (e.g., an AST, CFG, DFG) between nodes representing those tokens. For example, an arrow is shown between the argument a and its corresponding variable a within the function. The same goes for arguments b and c. Another arrow is shown between the variable s defined within the function and its use in a subsequent statement. Additional arrows are depicted between the variable s and the operator "+", as well as between the operator "+" and the variable c, to demonstrate that these tokens are related to each other. By contrast, no arrows are included, for instance, between the variables a and result, because those variables are not directly related to each other logically (although they may be indirectly related via one or more other variables, such as s).

In various implementations, any of the edges/arrows depicted in FIGS. 2A and 2B may be used to adapt a self-attention network of a translation machine learning model to sparsely attend across only those tokens that are related to each other logically and/or functionally. Put another way, based on these types of graphs, a subset of token pairs may be identified from a superset of all possible token pairs of the tokens in the source code in question. Each token pair of the subset may include snippet token that are represented by nodes connected by one or more edges of the one or more graphs. Then, a self-attention network of a translation machine learning model may be adapted to sparsely attend across the identified subset of token pairs, e.g., by not attending across other pairs outside of the subset. In some implementations, memory may only be allocated for the identified subset of token pairs, not for all possible token pairs, thereby preserving significant memory, which may allow the model to encode much larger input contexts.

FIG. 3 schematically depicts an example of how a source code file containing some number of functions may be processed using techniques described herein to adapt a self-attention network of a translation machine learning model to sparsely attend across pairs of tokens in which the individual tokens are logically related to each other, e.g., directly, or indirectly with one or more operator tokens (e.g., +, −, ≤, ≥, ×). Source code file 330 may include any number of global tokens, such as global variables, function declarations, class definitions, imported libraries, etc. Source code file 330 may also include any number of function definitions, e.g., corresponding to the global function declarations.

Source code file 330 may be processed to generate one or more graphs 332. One or more graphs may take various forms, such as ASTs, CFGs, DFGs, etc. In some implementations, source code file 330 may be processed to generate multiple different types of graphs, and the edges of the multiple graphs may be used to identify token pairs for sparse attention.

One or more graphs 332 may be evaluated to identify tokens that are represented by nodes connected by edges of the graph(s). For example, within a source code snippet that defines a function, a subset of snippet token pairs may be identified from a superset of all possible pairs of the snippet tokens in the source code snippet defining the function. Each token pair of the subset may include snippet tokens that are represented by nodes connected by one or more edges of the one or more graphs that correspond to the function definition.

A self-attention matrix 334 is depicted in FIG. 3 that demonstrates how various tokens may be attended against each other, given logical dependencies contained in the source code file 330. Each row represents a token and likewise each column represents a token. The cells therefore represent pair of tokens that can potentially be attended across. A legend is also provided at bottom left indicating which fill patterns represent which type of attention (or no attention).

In this example, it can be assumed that source code file 330 defines two global tokens outside of any function definitions. These global tokens are represented by the first two rows and the first two columns (as indicated at 336). Two tokens are shown in FIG. 3 for illustrative purposes—it is likely that in a real world example, there would be more than two global tokens. In some implementations, including that depicted in FIG. 3, the global tokens may be attended across all other tokens, as indicated by the "global attention" shading of the first two rows and first two columns indicated at 336. White cells in matrix 334 represent token pairs that are not attended ("no attention"). In FIG. 3, random tokens are attended across each other as well ("random attention" indicated with 342 at various locations), although this is not required.

Tokens within functions ("intra-function tokens") may be selectively attended across each other based on their dependencies on each other, as indicated by the "intra-function attention" shaded cells of self-attention matrix 334. More particularly, and as described previously, edges of a graph generated for a given function—whether a standalone graph or as a portion of a larger graph (e.g., representing the entire source code file 330)—may be used to determine which intra-function token pairs to attend across (e.g., nodes directly connected by edges), and which intra-function token pairs not to attend across (e.g., nodes not directly connected in graph, or connected by greater than some threshold number of edges).

For illustrative purposes, assume that source code file 330 defines three different functions. The tokens within these functions are shown paired with each other in self-attention matrix 334 in annotated (thick black lines) sub-grids of cells: 338-1 (a 3×3 grid), 338-2 (a 4×4 grid), and at 338-3 (another 3×3 grid). Put another way, each annotated sub-grid 338 represents a self-attention matrix for a given function of source code file 330. Within each sub-grid 338, shaded cells ("intra-function attention" from the legend) represent token pairs that are directly related (e.g., dependent upon each other, represented in graph(s) 332 with nodes that are directly connected by edges), and therefore are attended across. Non-shaded cells within each sub-grid 338 represent token pairs that are not attended against each other, e.g., because nodes representing those tokens in graph(s) 332 are not directly (or closely enough) connected by edges.

In addition to selectively attending within functions across intra-function token pairs, attention may be selectively applied across different functions as well, e.g., between inter-function token pairs. For example, one function may include a function call to one or more other functions, in which case the two or more functions (and at least some of their respective tokens) are dependent on each other, and therefore may be connected by edge(s) of graph(s) 332. Suppose a function $f$–2( ) includes, at the kth (positive integer) token, a function call to another function $f$–1( ). The token pair <ind($f$–2)+k, ind($f$–1)> can be selectively attended to impose the inter-function attention.

Self-attention matrix 334 includes, as black cells, several examples of "inter-function attention" being applied to inter-function token pairs. For example, on the bottom row of self-attention matrix 334, the third cell from the left is shaded black to annotate an inter-function token pair between the first function represented by sub-grid 338-1 and the third function represented by sub-grid 338-3. As another example, in the fifth row from bottom, the second cell from the right is shaded black to annotate an inter-function token pair between the second function represented by sub-grid 338-2 and the third function represented by sub-grid 338-3.

In various implementations, self-attention matrix 334 may correspond to (e.g., represent) the self-attention network used by a translation machine learning model to translate source code between programming languages. As can be seen, rather than attending across all possible tokens, only those token pairs that are depend on/from each other (as evidenced by their respective nodes being connected in graph(s) 332), as well as global tokens (with all other tokens) and some random pairings, are used to perform self-attention. The token pairs corresponding to the non-shaded, white cells are not attended. In some implementations, no memory is allocated for these unattended token pairs. These memory savings make translating between large source code files feasible, e.g., for performance at the edge, or within a reasonable or commercially-viable amount of time and memory.

Figure 4:
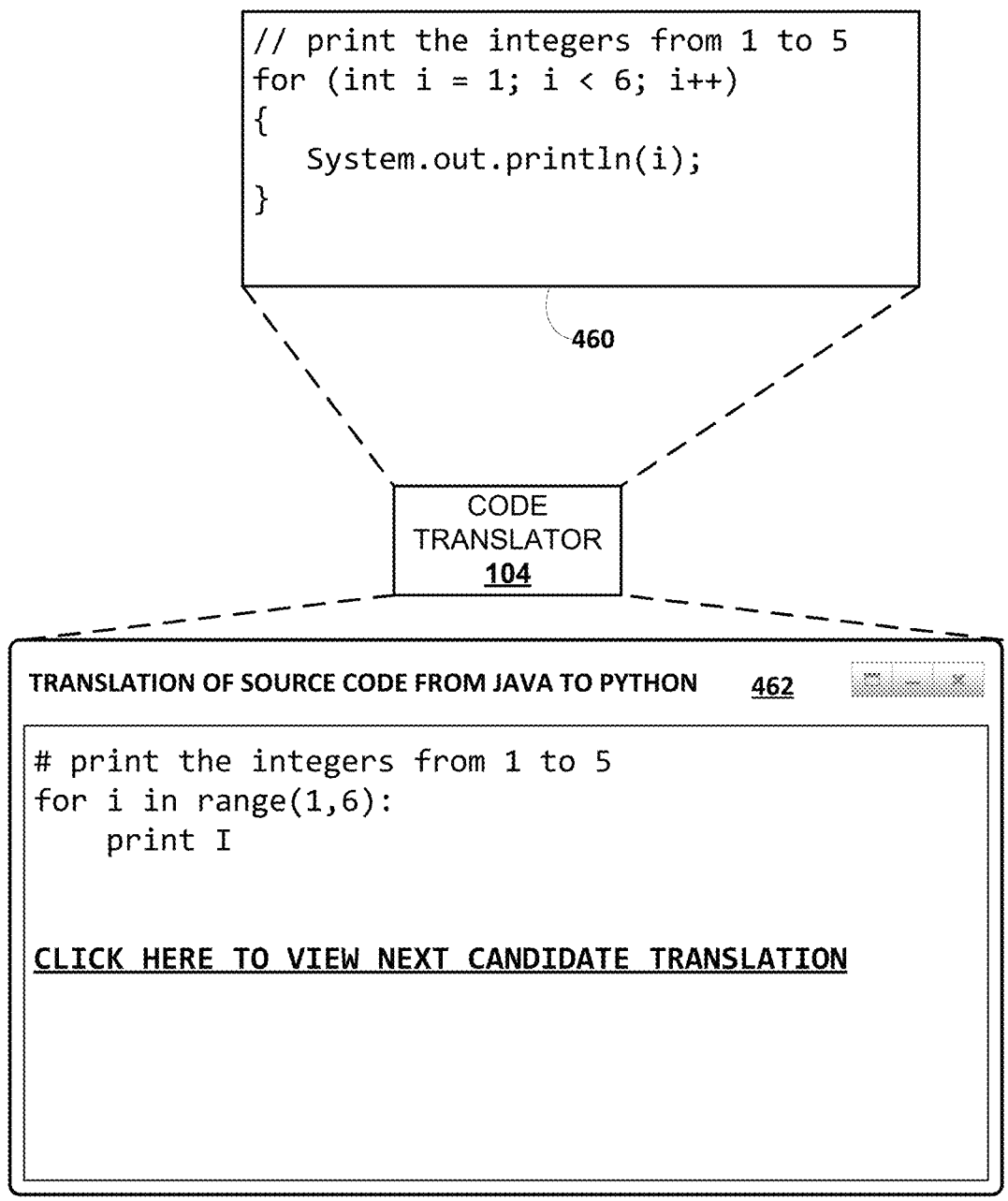
FIG. 4 depicts an example application of techniques described herein, in accordance with various implementations.

FIG. 4 depicts an example scenario in which a code snippet written in one programming language may be translated to another programming language. In this example, the base source code snippet 460 is written in Java and prints the integers one to five. At bottom, a graphical user interface ("GUI") 462 is depicted that may be presented to a developer who is unfamiliar with Java, but who has expertise in another programming language. In this example, the code snippet 460 written in Java is converted by code translator 104 into Python and rendered as part of GUI 462. In this way, the developer operating GUI 462 may view the source code in a programming language with which he or she is more familiar. In some cases, the developer may be able to edit the translated source code. In some such implementations, the edits made by the developer (i.e. to the Python code in FIG. 4) may be translated back to Java before being stored and/or more permanently incorporated into the code base. In other implementations, the edited Python code may be incorporated into the code base.

In some implementations, the original source code 460 may be sent to code knowledge system 102 for translation by code translator 104 prior to being sent to the computing device (not depicted) that renders GUI 462. In other implementations, GUI 462 may be part of a software development application that performs the programming language translation locally, e.g., using a plug-in or built-in functionality. The scenario of FIG. 4 is for illustrative purposes only. Source code may be translated between programming languages using techniques described herein for any number of applications.

For example, suppose a first user who is trained in a base programming language sends a source code snippet in the base programming language to a second user, e.g., as an attachment or in the body of an email. In some implementations, the source code in the based programming language may be translated into a target programming language en route to the second user, e.g., by code translator 104. Additionally or alternatively, in some implementations, the second user's email application (or an email server that stores emails of the second user) may have a plugin configured with selected aspects of the present disclosure.

In some implementations, a single user may operate a software development application to view multiple different source code snippets written in multiple different programming languages that are unfamiliar to the user. In some such examples, multiple respective translation models may be used to translate the source code snippets from the multiple different programming languages to a language (or languages) that are better understood to the user.

In some implementations, techniques described herein may be used to automatically convert source code written in one programming language into source code in another programming language, without necessarily presenting translated source code to users as described previously. For example, a company may decide to re-platform an existing code base 112 to a new programming language, e.g., to obtain new functionality and/or technical benefits (e.g., security features, processing speed features, etc.) that were unavailable with the original programming language. Such a company may be able to deploy techniques described herein, or request that an entity associated with code knowledge system 102 deploy techniques described herein, to automatically convert all or a portion of a code base 112 from one programming language to another.

It may be desirable to present a programmer with multiple different candidate translations of a source code snippet, e.g., so that the programmer can use their judgment to determine which candidate is best. These multiple different candidate translations may be determined, for instance, using techniques such as beam searching performed as part of a decoding process associated with a transformer network. Accordingly, in FIG. 4, a selectable link is presented ("CLICK HERE TO VIEW NEXT CANDIDATE TRANSLATION") that a user can select to see an alternative translation of the original source code snippet. In some implementations, these candidate translations may be presented to the user in a ranked order. This ranked order may be determined in various ways, such as by how many (or few) errors or warnings are raised when attempts are made to parse and/or compile the candidate translations (e.g., in the background without the user being aware). For example, various types of analysis associated with compiling, such as lexical analysis, syntax analysis, semantic analysis, and so forth, may be applied to each candidate translation to determine its score (which may be inversely proportional to the number of errors or warnings generated). The candidates with the "best" scores may be presented to the programmer first. In some implementations, candidate translations may be presented (or at least made available for presentation) until various criteria are met, such as a candidate no longer being capable of being compiled.

Figure 5:
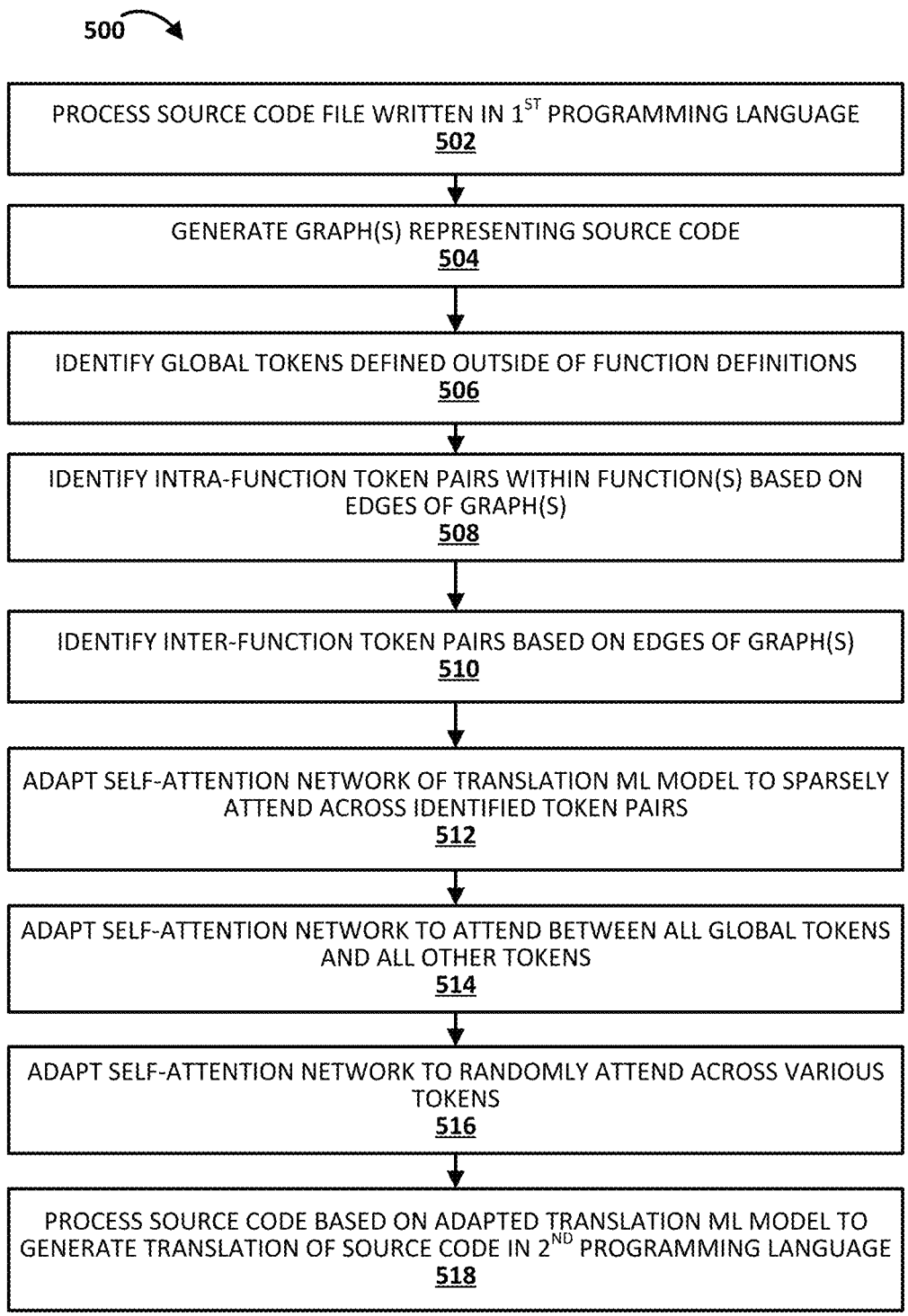
FIG. 5 depicts a flowchart illustrating an example method for practicing selected aspects of the present disclosure.

FIG. 5 is a flowchart illustrating an example method 500 of translating source code from a first programming language to a second programming language, in accordance with various implementations. For convenience, the operations of the flow chart are described with reference to a system that performs the operations. This system may include various components of various computer systems, such as one or more components of code knowledge system 102. Moreover, while operations of method 500 are shown in a particular order, this is not meant to be limiting. One or more operations may be reordered, omitted or added.

At block 502, the system, e.g., by way of code translator 104, may process source code (e.g., source code file 330) written in a first programming language (e.g., Python). Based on the processing at block 502, at block 504, the system, e.g., by way of code translator 104, may generate one or more graphs (e.g., 332) representing the source code. As noted previously, these graph(s) may include, for instance, an AST, a CFG, a DFG, or other types of graphs that can be generated to represent tokens and logical relationships defined in source code.

At block 506, the system, e.g., by way of code translator 104, may identify global tokens that are defined outside of function definitions. These global tokens may include, for instance, global variables, class definitions, object definitions, function declarations, and so forth. At block 508, the system, e.g., by way of code translator 104, may identify, e.g., from a superset of all intra-function token pairs within each function defined by the source code, a subset of intra-function token pairs that should be attended, e.g., based on edge(s) of the graph(s) generated at block 504. For instance, any intra-function token pairs with nodes directly connected by an edge in the graph(s) may be considered related, and therefore may be identified as part of a subset of intra-function token pairs that should be attended. These intra-function token pairs were annotated by the shaded cells in self-attention matrix in FIG. 3.

At block 510, the system, e.g., by way of code translator 104, may identify, as worthy of having attention applied between them, inter-function token pairs that correspond to dependencies across functions. For example, one function may call another function, thereby introducing inter-dependencies between the functions. These inter-function token pairs were annotated by the black cells in self-attention matrix in FIG. 3.

At block 512, the system, e.g., by way of code translator 104, may adapt a self-attention network of a translation machine learning model to sparsely attend across token pairs identified in blocks 508-510, including intra-function attention and inter-function attention. In some implementations, the translation machine learning model may take the form of a BERT transformer, and the self-attention network may be applied during encoding, although this is not required.

At optional block 514, the system, e.g., by way of code translator 104, may adapt the self-attention network to attend between all global tokens and all other tokens. An example of this was depicted in FIG. 3 at 336. At optional block 516, the system, e.g., by way of code translator 104, may adapt the self-attention network to randomly attend across various tokens, regardless of whether those randomly-attended tokens are related or not. At block 518, the system, e.g., by way of code translator 104, may process the source code based on the adapted translation machine learning model to generate a translation of the source code in a second programming language (e.g., Java, C++).

Figure 6:
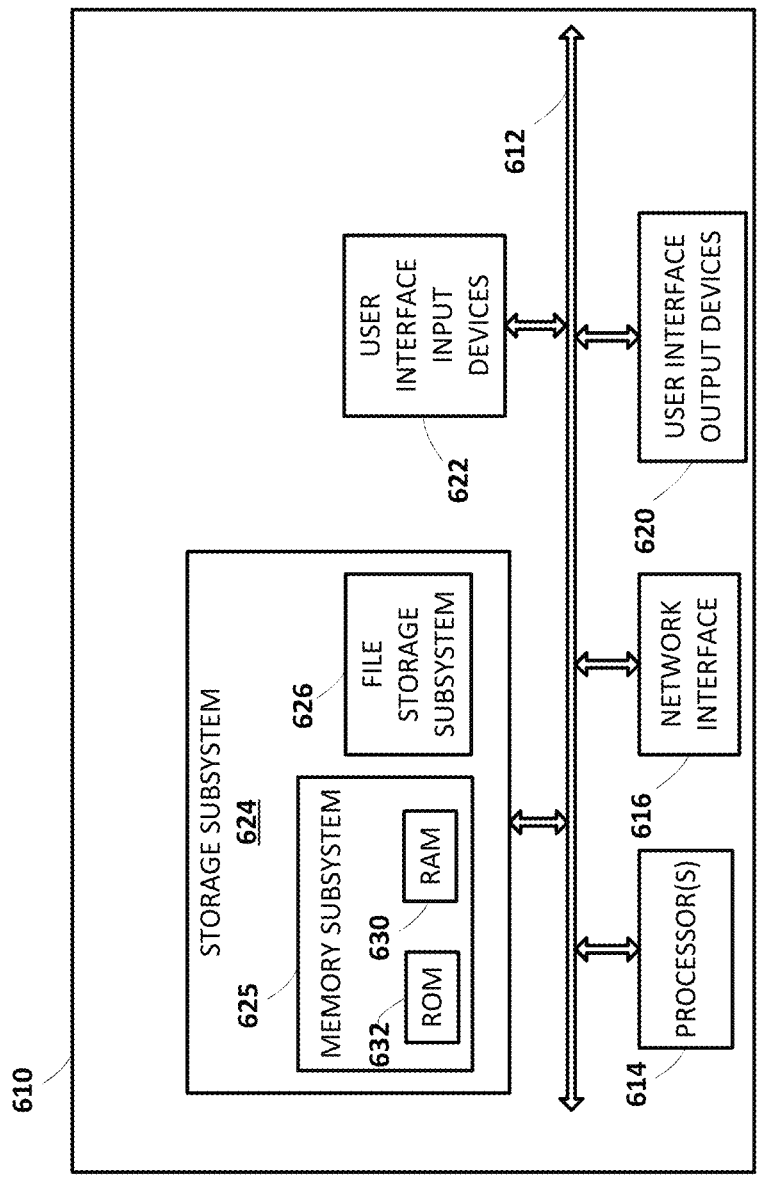
FIG. 6 illustrates an example architecture of a computing device.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIG. 5, as well as to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple buses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for translating a source code snippet from a first programming language to a second programming language, the method implemented by one or more processors and comprising:

obtaining one or more graphs representing snippet tokens, and relationships between the snippet tokens, contained in the source code snippet written in the first programming language;

based on the one or more graphs, selecting, from a superset of all possible pairs of the snippet tokens in the source code snippet, a subset of snippet token pairs that comprises less than the superset of all possible pairs, wherein each token pair of the selected subset includes snippet tokens that are represented by nodes connected by fewer than a threshold number of edges of the one or more graphs;

adapting a self-attention network of a large language model to sparsely attend across token pairs of the selected subset of token pairs; and processing the source code snippet based on the adapted large language model to translate the source code snippet from the first programming language to the second programming language.

2. The method of claim 1, wherein the one or more graphs include at least one of a data flow graph (DFG), a control flow graph (CFG), or an abstract syntax tree (AST) representing the source code snippet.

3. The method of claim 1, wherein the edges of one or more of the graphs represent dependencies between the snippet tokens.

4. The method of claim 1, wherein the source code snippet comprises a function, and the method further includes processing an entire source code file that contains the function to identify global tokens defined in a portion of the source code file outside of the function, wherein the self-attention network is adapted based at least in part on the global tokens.

5. The method of claim 4, further comprising adapting the self-attention network of the large language model to attend between each of the global tokens and all other tokens of the source code file.

6. The method of claim 4, further comprising:
analyzing the one or more graphs to identify, as inter-function token pairs, tokens from different functions that are connected by one or more edges of one or more of the graphs; and
adapting the self-attention network to further sparsely attend across the inter-function token pairs.

7. The method of claim 6, wherein one or more of the inter-function pairs comprises a function definition and a function call.

8. The method of claim 4, further comprising:
identifying dependencies between one or more other functions of the source code file and the function defined in the source code snippet; and
adapting the self-attention network of the large language model to further sparsely attend based on the identified dependencies.

9. The method of claim 1, further comprising adapting the self-attention network to attend across other randomly-selected token pairs of the superset.

10. A system for translating a source code snippet from a first programming language to a second programming language, the system comprising one or more processors and memory storing instructions that, in response to execution of the instructions, cause the one or more processors to:
obtain one or more graphs representing snippet tokens, and relationships between the snippet tokens, contained in the source code snippet written in the first programming language;
based on the one or more graphs, select, from a superset of all possible pairs of the snippet tokens in the source code snippet, a subset of snippet token pairs that comprises less than the superset of all possible pairs, wherein each token pair of the selected subset includes snippet tokens that are represented by nodes connected by fewer than a threshold number of edges of the one or more graphs;
adapt a self-attention network of a large language model to sparsely attend across token pairs of the selected subset of token pairs; and
process the source code snippet based on the adapted large language model to translate the source code snippet from the first programming language to the second programming language.

11. The system of claim 10, wherein the one or more graphs include at least one of a data flow graph (DFG), a control flow graph (CFG), or an abstract syntax tree (AST) representing the source code snippet.

12. The system of claim 10, wherein the edges of one or more of the graphs represent dependencies between the tokens.

13. The system of claim 10, wherein the source code snippet comprises a function, and the instructions further includes instructions to process an entire source code file that contains the function to identify global tokens defined in a portion of the source code file outside of the function, wherein the self-attention network is adapted based at least in part on the global tokens.

14. The system of claim 13, further comprising instructions to adapt the self-attention network of the large language model to attend between each of the global tokens and all other tokens of the source code file.

15. The system of claim 13, further comprising instructions to:
analyze the one or more graphs to identify, as inter-function token pairs, tokens from different functions that are connected by one or more edges of one or more of the graphs; and
adapt the self-attention network to further sparsely attend across the inter-function token pairs.

16. The system of claim 15, wherein one or more of the inter-function pairs comprises a function definition and a function call.

17. The system of claim 13, further comprising instructions to:
identify dependencies between one or more other functions of the source code file and the function defined in the source code snippet; and
adapt the self-attention network of the large language model to further sparsely attend based on the identified dependencies.

18. The system of claim 10, further comprising instructions to adapt the self-attention network to attend across other randomly-selected pairs of the superset.

19. A non-transitory computer-readable medium for translating a source code snippet from a first programming language to a second programming language, the medium comprising instructions that, in response to execution of the instructions by a processor, cause the processor to:
obtain one or more graphs representing snippet tokens, and relationships between the snippet tokens, contained in the source code snippet written in the first programming language;
based on the one or more graphs, select, from a superset of all possible pairs of the snippet tokens in the source code snippet, a subset of snippet token pairs that comprises less than the superset of all possible pairs, wherein each token pair of the selected subset includes snippet tokens that are represented by nodes connected by fewer than a threshold number of edges of the one or more graphs;
adapt a self-attention network of a large language model to sparsely attend across token pairs of the selected subset of token pairs; and
process the source code snippet based on the adapted large language model to translate the source code snippet from the first programming language to the second programming language.

20. The non-transitory computer-readable medium of claim 19, wherein the one or more graphs include at least one of a data flow graph (DFG), a control flow graph (CFG), or an abstract syntax tree (AST) representing the source code snippet.

* * * * *